United States Patent
Wigmore et al.

(10) Patent No.: US 8,028,062 B1
(45) Date of Patent: Sep. 27, 2011

(54) NON-DISRUPTIVE DATA MOBILITY USING VIRTUAL STORAGE AREA NETWORKS WITH SPLIT-PATH VIRTUALIZATION

(75) Inventors: Ian Wigmore, Westborough, MA (US); Ofer Michael, Irvine, CA (US); Arieh Don, Newton, MA (US); Patrick Brian Riordan, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 353 days.

(21) Appl. No.: 12/005,663

(22) Filed: Dec. 26, 2007

(51) Int. Cl.
*G06F 15/16* (2006.01)

(52) U.S. Cl. ............................................. 709/224; 711/6

(58) Field of Classification Search .................... 709/212
See application file for complete search history.

(56) References Cited

U.S. PATENT DOCUMENTS

| | | | | |
|---|---|---|---|---|
| 4,802,084 | A * | 1/1989 | Ikegaya et al. ..................... | 711/6 |
| 5,875,457 | A * | 2/1999 | Shalit ............................. | 711/114 |
| 6,343,324 | B1 * | 1/2002 | Hubis et al. ..................... | 709/229 |
| 6,453,392 | B1 * | 9/2002 | Flynn, Jr. ........................ | 711/151 |
| 6,574,667 | B1 * | 6/2003 | Blumenau et al. ............... | 709/229 |
| 6,789,122 | B1 * | 9/2004 | Slaughter et al. ................ | 709/229 |
| 6,934,799 | B2 * | 8/2005 | Acharya et al. ................. | 711/112 |
| 6,983,303 | B2 * | 1/2006 | Pellegrino et al. .............. | 709/203 |
| 6,996,582 | B2 * | 2/2006 | Daniels et al. .................. | 711/203 |
| 7,080,221 | B1 * | 7/2006 | Todd et al. ...................... | 711/161 |
| 7,111,066 | B2 * | 9/2006 | Bellon ............................. | 709/229 |
| 7,209,986 | B2 * | 4/2007 | Ohno et al. ..................... | 710/74 |
| 7,415,506 | B2 * | 8/2008 | Gajjar et al. ................... | 709/215 |
| 7,424,533 | B1 * | 9/2008 | Di Benedetto et al. ........ | 709/226 |
| 7,430,593 | B2 * | 9/2008 | Baldwin et al. ............... | 709/223 |
| 7,469,281 | B2 * | 12/2008 | Kaneda et al. ................. | 709/223 |
| 7,512,744 | B2 * | 3/2009 | Banga et al. .................... | 711/147 |
| 7,596,676 | B2 * | 9/2009 | Serizawa et al. .............. | 711/203 |
| 7,668,981 | B1 * | 2/2010 | Nagineni et al. ................ | 710/38 |
| 7,669,032 | B2 * | 2/2010 | Karr et al. ...................... | 711/203 |
| 2002/0019922 | A1 * | 2/2002 | Reuter et al. .................... | 711/206 |
| 2003/0079014 | A1 * | 4/2003 | Lubbers et al. ................ | 709/225 |
| 2003/0131182 | A1 * | 7/2003 | Kumar et al. ...................... | 711/5 |
| 2003/0172149 | A1 * | 9/2003 | Edsall et al. .................... | 709/224 |
| 2004/0153844 | A1 * | 8/2004 | Ghose et al. ..................... | 714/42 |
| 2004/0215749 | A1 * | 10/2004 | Tsao ............................... | 709/220 |
| 2005/0010688 | A1 * | 1/2005 | Murakami et al. ............ | 709/245 |

(Continued)

OTHER PUBLICATIONS

Cwiakala, R., et al. *MVS Dynamic Reconfiguration Management*, IBM J. Res. Develop., vol. 36, No. 4, Jul. 1992, pp. 633-646.

(Continued)

*Primary Examiner* — Bunjob Jaroenchonwanit
(74) *Attorney, Agent, or Firm* — Muirhead and Saturnelli, LLC

(57) ABSTRACT

A system creates a storage area network (SAN) centric storage virtualization layer in front of storage devices. The system allows data mobility and migration without disruption to the one or more host servers attached to the SAN. Specifically, the host servers are not disrupted when switching I/Os between physical and virtual storage, for example, by taking advantage of WWPN spoofing and Fibre Channel VSAN technology. The use of VSANs effectively allow multiple virtual directors and/or switches to be created within a physical director and/or switches, each with their own separate name server, thereby providing complete isolation from one another. The host-storage pathing information is unchanged as the original physical storage port's WWPNs are spoofed by the virtual storage port. The result is two identical WWPNs within the SAN which is normally disallowed; however, by separating the physical port WWPN into one VSAN and the virtual port WWPN into another, the restriction may be circumvented.

25 Claims, 13 Drawing Sheets

U.S. PATENT DOCUMENTS

| | | | |
|---|---|---|---|
| 2005/0235132 A1* | 10/2005 | Karr et al. | 711/203 |
| 2006/0112251 A1* | 5/2006 | Karr et al. | 711/170 |
| 2006/0282618 A1* | 12/2006 | Thompson et al. | 711/118 |
| 2007/0220310 A1* | 9/2007 | Sharma et al. | 714/6 |
| 2007/0245101 A1* | 10/2007 | Taguchi et al. | 711/161 |
| 2008/0098183 A1* | 4/2008 | Morishita et al. | 711/154 |
| 2008/0189700 A1* | 8/2008 | Schmidt et al. | 718/1 |
| 2009/0276568 A1* | 11/2009 | Chikusa et al. | 711/114 |
| 2010/0115131 A1* | 5/2010 | Eisenhauer et al. | 709/245 |

OTHER PUBLICATIONS

U.S. Appl. No. 11/823,683, filed Jun. 28, 2007, Wigmore.
U.S. Appl. No. 11/823,619, filed Jun. 28, 2007, Wigmore.
U.S. Appl. No. 10/879,383, filed Jun. 29, 2004, Halligan, et al.

* cited by examiner

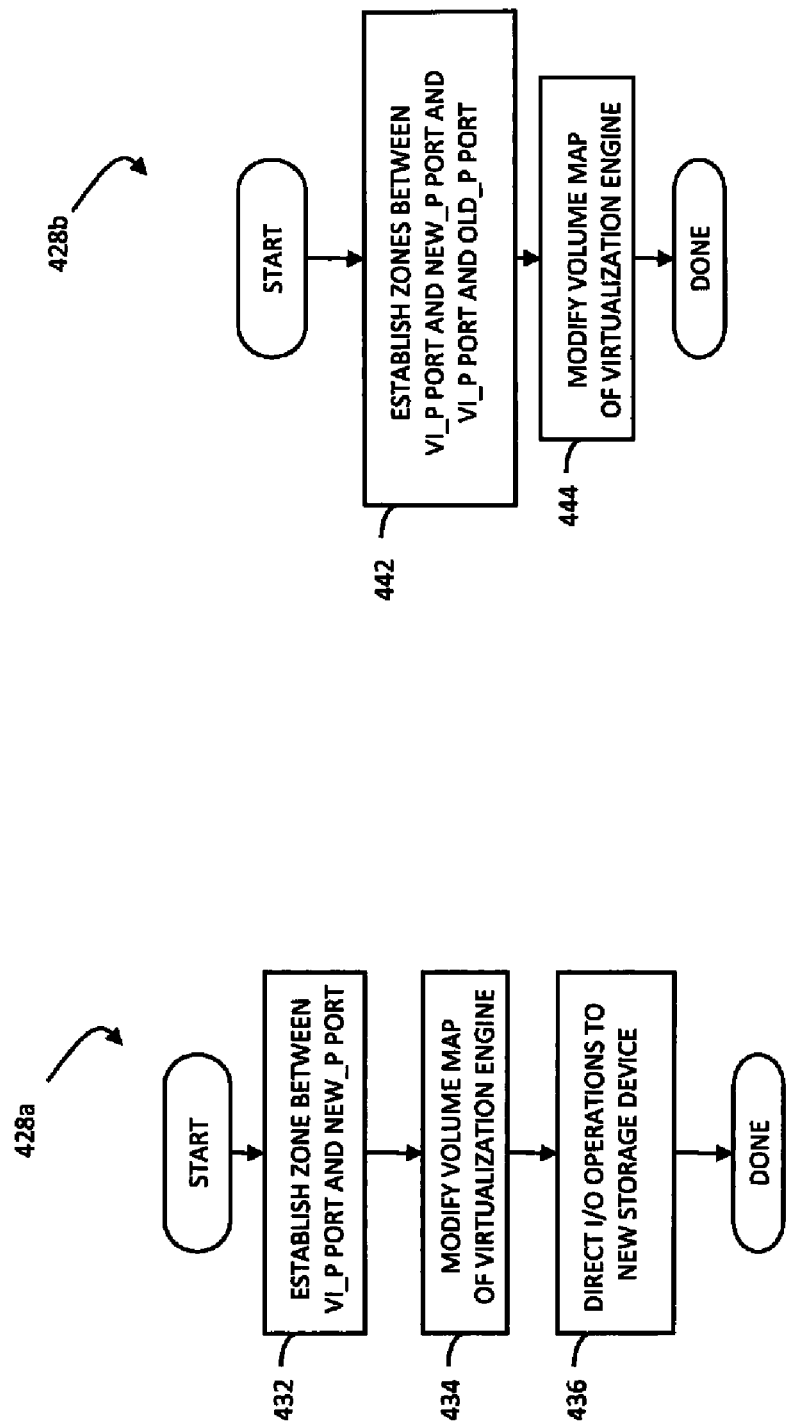

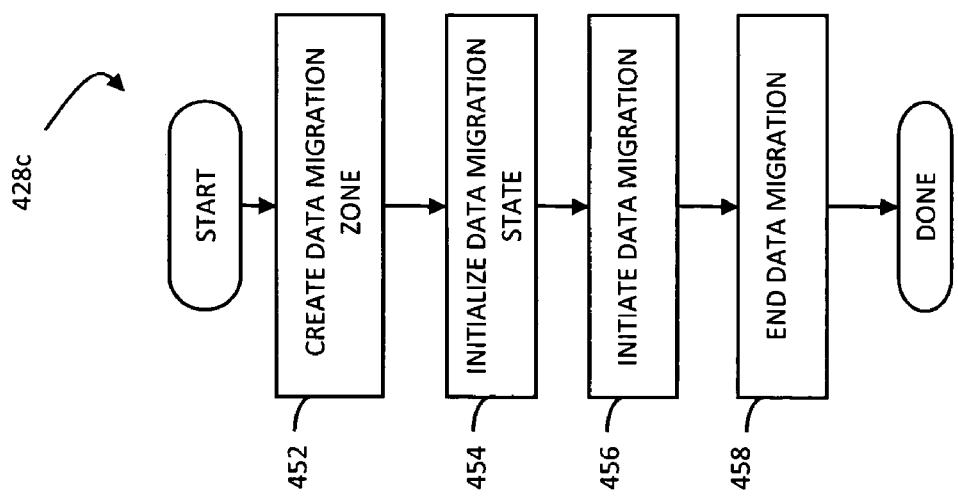

NON-DISRUPTIVE DATA MOBILITY USING VIRTUAL STORAGE AREA NETWORKS WITH SPLIT-PATH VIRTUALIZATION

TECHNICAL FIELD

This application relates to computer storage devices, and more particularly to the field of data mobility between storage devices coupled to a network.

BACKGROUND OF THE INVENTION

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The storage area network may be essentially transparent to the devices so that the devices operate in a manner identical or similar to their operation when directly connected to each other. The switches may be programmed to allow connections between specific ports of devices coupled to the switches. A port that can initiate a data-path connection is called an "initiator" port while the other port may be deemed a "target" port.

Referring to FIG. 1, a storage area network 20 is shown as having a plurality of host devices 22-24 and a plurality of storage devices 26-28 coupled thereto. Each of the devices 22-24, 26-28 has a corresponding port that is physically coupled to switches used to implement the storage area network 20. The switches may be separately programmed by one of the devices 22-24, 26-28 or by a different device (not shown). Programming the switches may include setting up specific zones that describe allowable data-path connections (which ports may form a data-path connection) and possible allowable initiator ports of those configurations. For example, there may be a zone for connecting the port of the host 22 with the port of the storage device 28. Upon becoming activated (e.g., powering up), the host 22 and the storage device 28 may send appropriate signals to the switch(es) of the storage area network 20, and each other, which then allows the host 22 to initiate a data-path connection between the port of the host 22 and the port of the storage device 28. Zones may be defined in terms of a unique identifier associated with each of the ports, such as such as a 64-bit world-wide port name (WWPN).

In some cases, it may be desirable to replace or at least augment a storage device coupled to the storage area network 20. However, since each port of each storage device has a unique identifier (e.g., WWPN), and since the zones are programmed into the switch(es) of the storage area network 20 using the unique identifiers, using a new storage device could require reprogramming all of the hosts coupled to the old storage device and/or could require adding new zones for the new storage device, one or both of which may be unacceptable. For example, there may be instances where it is not acceptable to have any appreciable downtime of mission-critical applications running on hosts.

Accordingly, it would be desirable to be able to provide a mechanism for seamlessly migrating data and redirecting I/O (input/output) operations for storage devices coupled to a storage area network, for example, without requiring reprogramming of hosts to change pathing information.

SUMMARY OF THE INVENTION

According to the system described herein, a method for providing non-disruptive data mobility in connection with a first storage device coupled to a storage area network and a second storage device coupled to the storage area network includes blocking I/O operations for a first port of the first storage device coupled to the storage area network, wherein the first port is associated with a first identifier. A first virtual storage area network and a second virtual storage area network are created within the storage area network. The first storage device is coupled to the second virtual storage area network via the first port of the first storage device having the first identifier. The second storage device is coupled to the second virtual storage area network via a first port of the second storage device having a second identifier different from the first identifier. A virtualization engine is coupled to the first virtual storage area network via a first port of the virtualization engine that is associated with the first identifier. The virtualization engine is coupled to the second virtual storage area network via a second port of the virtualization engine. At least a portion of I/O operations received by the virtualization engine through the first port thereof are caused to be routed through the second port thereof to the second virtual storage area network. The identifiers associated with the ports may be worldwide port names, and the storage area network provides fibre channel connections.

According further to the system described herein, computer software, stored on a computer-readable medium, may provide non-disruptive data mobility in connection with a first storage device coupled to a storage area network and a second storage device coupled to the storage area network. Executable code may block I/O operations for a first port of the first storage device coupled to the storage area network, wherein the first port is associated with a first identifier. Executable code may create a first virtual storage area network and a second virtual storage area network within the storage area network. Executable code may couple the first storage device to the second virtual storage area network via the first port of the first storage device having the first identifier. Executable code may couple the second storage device to the second virtual storage area network via a first port of the second storage device having a second identifier different from the first identifier. Executable code may couple a virtualization engine to the first virtual storage area network via a first port of the virtualization engine that is associated with the first identifier. Executable code may couple the virtualization engine to the second virtual storage area network via a second port of the virtualization engine. Executable code may causes at least a portion of I/O operations received by the virtualization engine through the first port thereof to be routed through the second port thereof to the second virtual storage area network. The identifiers associated with the ports may be worldwide port names.

Additionally, the system described herein may provide a method and software with executable code in which inter-virtual storage area network routing may be configured to allow driving of I/O operations across the first and second virtual storage area networks. The inter-virtual storage area network routing may be removed before causing the I/O operations received by the virtualization engine to be routed to the second virtual storage area network. The portion of I/O operations routed from the virtualization engine to the second virtual storage area network may be routed through the second virtual storage area network to the first port of the second storage device. The portion of I/O operations routed from the virtualization engine to the second virtual storage area network may be routed through the second virtual storage area network to the first port of the first storage device. Data may be migrated from the first storage device to the second storage device via the second virtual storage area network. Virtual logical unit numbers of the virtualization engine may be mapped to physical logical unit numbers of at least one of the first storage device and the second storage device.

According further to the system described herein, a system for providing non-disruptive data mobility includes a storage area network including a first virtual storage area network and a second virtual storage area network. A first storage device may be coupled to the second virtual storage area network via a first port of the first storage device associated with a first identifier. A second storage device may be coupled to the second virtual storage area network via a first port of the second storage device associated with a second identifier different from the first identifier. A virtualization engine may be coupled to the first virtual storage area network via a first port of the virtualization engine associated with the first identifier and coupled to the second virtual storage area network via a second port of the virtualization engine, wherein at least a portion of I/O operations received by the virtualization engine through the first port thereof are routed to the second virtual storage area network through the second port thereof. The portion of I/O operations routed from the virtualization engine to the second virtual storage area network may be routed through the second virtual storage area network to the first port of the second storage device. The portion of I/O operations routed from the virtualization engine to the second virtual storage area network are routed through the second virtual storage area network to the first port of the first storage device. Data may be migrated from the first storage device to the second storage device via the second virtual storage area network. The virtualization engine may include virtual logical unit numbers that are mapped to physical logical unit numbers of at least one of: the first storage device and the second storage device.

According further to the system described herein, a method for providing non-disruptive data mobility among a first storage device coupled to a storage area network and a second storage device coupled to the storage area network includes blocking I/O operations for a first port the first storage device coupled to the storage area network, wherein the first port is associated with an identifier. A first virtual storage area network and a second virtual storage area network are created within the storage area network. A connection is established between a host and the first virtual storage area network. A connection is established between the first virtual storage area network and the second virtual storage area network. At least a portion of I/O operations by the host are caused to be routed through the second virtual storage area network, wherein pathing information at the host directing I/O operations between the host and the first port of the first storage device associated with the identifier is independent of a routing of the I/O operations through the second virtual storage area network. The portion of I/O operations routed through the second virtual storage area network are routed to the first port of the second storage device.

According further to the system described herein, computer software, stored in a computer-readable medium, provides non-disruptive data mobility among a first storage device coupled to a storage area network and a second storage device coupled to the storage area network. Executable code blocks I/O operations for a first port the first storage device coupled to the storage area network, wherein the first port is associated with an identifier. Executable code creates a first virtual storage area network and a second virtual storage area network within the storage area network. Executable code establishes a connection between a host and the first virtual storage area network. Executable code establishes a connection between the first virtual storage area network and the second virtual storage area network. Executable code causes at least a portion of I/O operations by the host to be routed through the second virtual storage area network, wherein pathing information at the host directing I/O operations between the host and the first port of the first storage device associated with the identifier is independent of a routing of the I/O operations through the second virtual storage area network. The portion of I/O operations routed through the second virtual storage area network are routed to the first port of the second storage device.

BRIEF DESCRIPTION OF THE DRAWINGS

FIG. 16 is a flowchart showing an embodiment of non-disruptive data mobility in connection with processing shown in FIG. 15 according to the system described herein.

FIG. 17 is a flowchart showing an embodiment of non-disruptive data mobility and migration with split path virtualization in connection with processing shown in FIG. 15 according to the system described herein.

FIG. 18 is a flowchart showing an embodiment of non-disruptive data migration in connection with processing shown in FIG. 15 according to the system described herein.

DETAILED DESCRIPTION OF VARIOUS EMBODIMENTS

The system described herein facilitates selectively migrating data from a first storage device to second storage device without disrupting any applications that use either storage device. Following the migration process, some data may remain and be accessed on the first storage device while other data is accessed on the second storage device. The system uses virtual SANs (VSANs) to facilitate the migration. Note that, as an introduction to describing the selective migration, the discussion below initially focuses on migrating an entire storage device.

Figure 2:
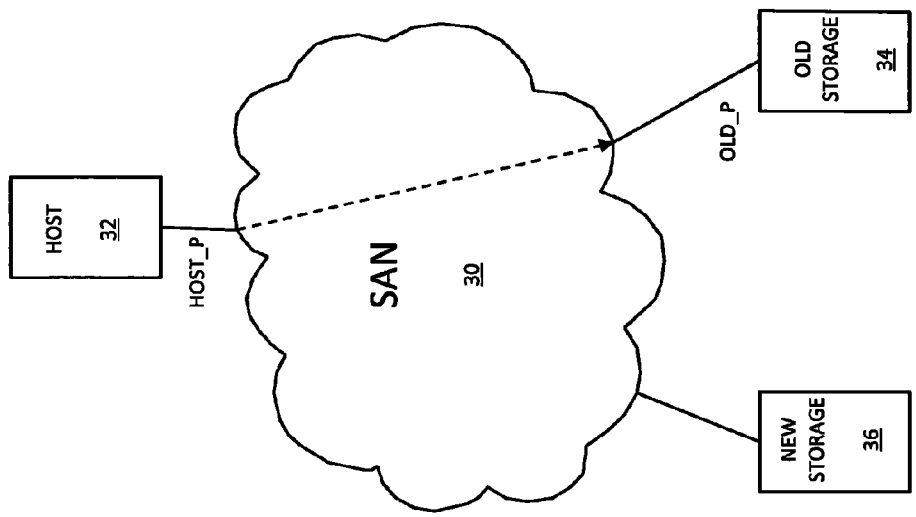
FIG. 2 is a diagram illustrating a storage area network coupled to a host, an old storage device, and a new storage device with a data path from the host to the old storage device according to the system described herein.
Figure 1:
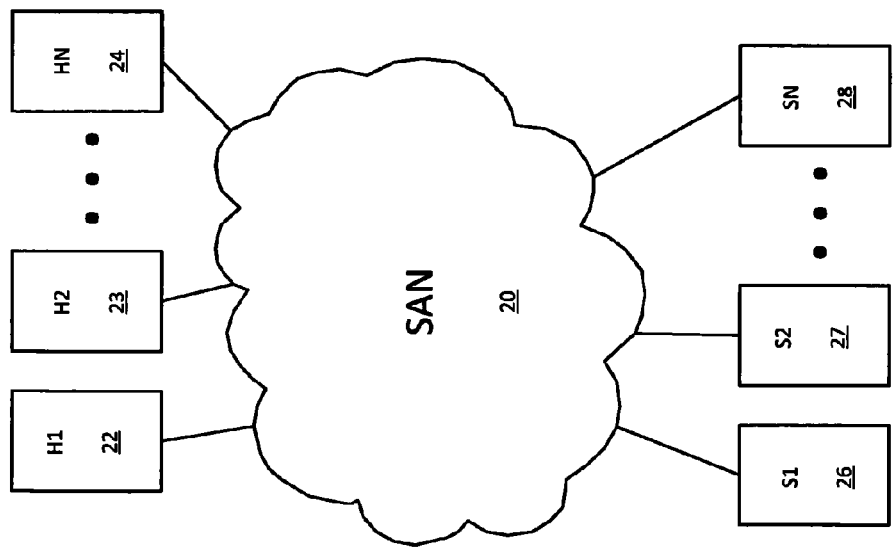
FIG. 1 is a diagram showing a conventional storage area network coupled to a plurality of host devices and a plurality of storage devices.

Referring to FIG. 2, a storage area network 30 is shown as having coupled thereto a host 32, an old storage device 34, and a new storage device 36. FIG. 2 illustrates the use of the storage area network 30 to facilitate couplings between ports of devices. In an embodiment herein, the storage area network 30 may be provided using conventional Fibre Channel connectivity protocol and one or more switches. Of course, in other embodiments, the storage area network 30 may provide coupling using other appropriate connectivity protocols and/or switch technology consistent with the description herein.

Note that the storage area network 30 is illustrated in FIG. 2 with only a single host and two storage devices, but the system described herein may be implemented for systems having any number of hosts and any number of storage devices coupled to the storage area network of 30. A host and/or storage device may have multiple ports. Note also that the host 32 should be understood as including any device which may read and/or write data from and to a storage device. For example, the host 32 could, in some cases, represent another storage device. Similarly, a storage device should be understood as including any apparatus or portion thereof capable of receiving data and returning received data.

Data may be organized on the storage devices 34, 36 as one or more logical volumes that map to physical storage locations. The host 32 may access the logical volumes by specifying locations on the logical volumes (e.g., volume ID, cylinder, and track, block no., etc.). The host 32 may access logical volumes using a port ID and logical volume identifier. The locations on the logical device may be translated by the storage device to physical storage locations. Note that contiguous sections of logical storage locations may correspond to noncontiguous sections of physical storage locations and that it is possible for a single logical volume to correspond to more than one physical volume. In an embodiment herein, each logical volume has a number of cylinders that each contain a plurality of tracks of data and each track of data contains a number of 512-byte blocks of data. Of course, other size blocks are possible, such as blocks having 180, 520, 452, and 1024 bytes per block, or any other number of bytes per block. It may also be possible to have a variable number of bytes per block.

In an embodiment herein, each of the devices 32, 34, 36 is coupled to the storage area network 30 and uses a unique worldwide port name (WWPN) to identify the ports of devices coupled to the storage area network 30. The WWPN may be a unique 64-bit number that may be assigned by the manufacturer of a device. In some instances, at least a portion of the WWPN is assigned by a trade group which provides unique identifiers to different manufacturers to ensure that each WWPN is unique and contains appropriate manufacturer identification information. In FIG. 2, the identifier HOST_P is used to represent the WWPN of the host 32 while the identifier OLD_P is used to represent the WWPN of the old storage device 34. Such identifiers may be used to represent the WWPN of specific ports to facilitate the description herein. Note, however, that any appropriate identifiers may be used to identify ports of devices coupled to the storage area network 30.

Connections between ports of devices provided by the storage area network 30 may be specified in a conventional fashion using appropriate instructions to the one or more switches of the storage area network 30. The instructions may indicate which port connections are proper by establishing zones, which may also indicates which of the ports may initiate a data-path connection. For example, a zone may indicate that it is appropriate to couple the HOST_P port of the host device 32 with the OLD_P port of the old storage device 30. The zone may also indicate that the HOST_P port may be the initiator of the data-path connection. In other embodiments, the zone may not include information indicating initiator and target roles of ports. The one or more switches that provide the storage area network 30 may then be provided with appropriate instructions to set up a zone between HOST_P and OLD_P with the HOST_P port being the allowable initiator. Subsequently, when the old storage device 34 is coupled to the storage area network 30 via the OLD_P port, the switch(es) of the storage area network 30 receive a signal from the old storage device 34 indicating that the OLD_P port is available. Similarly, the switch(es) of the storage area network 30 receive a signal from the host 32 via the HOST_P port to indicate that the HOST_P port is available. Following that, the host 32 may initiate a data-path connection with the old storage device 34 using the HOST_P port, in which case the one or more switches of the storage area network 30 may establish the data-path connection between the HOST_P port and the OLD_P port. Such a connection is illustrated by the dashed line within the storage area network 30 in FIG. 2.

The system described herein provides a transparent transition whereby the host 32 initially performs I/O operations with the old storage device 34 (as shown in FIG. 2) and then transitions to performing I/O operations with the new storage device 36 in a way that does not require significant alteration of the switch(es) within the storage area network 30 and does not require reprogramming or restarting the applications running in the host 32. The coupling between the host 32 and the old storage device 34 is broken, a data migration from the old storage device 34 to the new storage device 36 is initiated, and I/O operations are resumed between the host 32 and the new storage device 36, all transparent to the host 32.

Figure 3:
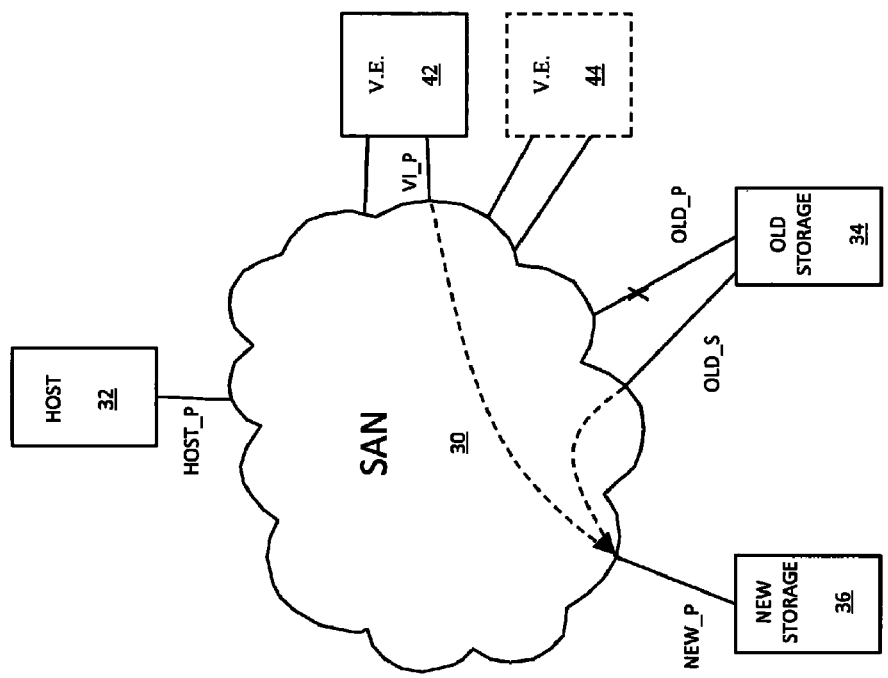
FIG. 3 is a diagram illustrating a storage area network coupled to a host, a new storage device, an old storage device, a virtualization engine, and a secondary virtualization engine with a data path from the virtualization engine to a new storage device according to the system described herein.

Referring to FIG. 3, the storage area network 30 is shown as having coupled thereto a virtualization engine 42, which facilitates I/O redirection and acts as a virtualization engine in a manner described in more detail elsewhere herein. The virtualization engine 42 includes at least two ports that may be coupled to the storage area network 30. One of the ports may be an initiator port VI_P. As described in more detail elsewhere herein, the virtualization engine 42 facilitates data redirection so that I/O operations from the host 32 directed to the OLD_P port of the old storage device 34 are redirected to the new storage device 36. In an embodiment herein, the virtualization engine 42 may be implemented using an Emulex AV150 ASIC on an AD1500 board in a Linux server or an Emulex Raptor ASIC on an AD2500 board in a Linux server. In other embodiments, it may be possible to provide the Emulex products, or similar products, directly on the host 32 and/or one of the storage devices 34, 36.

A secondary virtualization engine 44 may also be provided and coupled to the storage area network 30. The secondary virtualization engine 44 may be used to provide redundancy for the virtualization engine 42. In an embodiment herein, the secondary virtualization engine 44 is not used unless and until the virtualization engine 42 fails, in which case the secondary virtualization engine 44 may perform the tasks otherwise performed by the virtualization engine 42, which may be known as active-passive mode. However, in other embodiments, it is possible to split the work load between the virtualization engine 42 and the secondary virtualization engine 44 during normal operation, which may be known as active-active mode. In such a case, if one of the virtualization engines 42, 44 fails, all the workload is shifted to the non-failing one of the virtualization engines 42, 44. For the remainder of the discussion herein, it may be assumed that the secondary virtualization engine 44 and/or any other appropriate redundant components, such as dual SANs, are provided to protect against failure of a single component. However, redundant components will not be discussed further in detail herein.

As shown in FIG. 3, a connection (and zone) may be established between the port in VI_P of the virtualization engine 42 and the port NEW_P of the new storage device 36. The data-path connection between the ports VI_P and NEW_P may be used to facilitate I/O redirection as described in more detail elsewhere herein. FIG. 3 also illustrates establishing a new port, OLD_S, at the old storage device 34 and establishing a connection (and zone) from the OLD_S port of the old storage device 34 to the NEW_P port of the new storage device 36. The "_P" and "_S" suffixes may be used to indicate primary and secondary ports. The connection between OLD_S and NEW_P may be used to facilitate data migration from the old storage device 34 to the new storage device 36, as described in more detail elsewhere herein. Note also that the OLD_P port of the old storage device 34 has been blocked, thus breaking the data-path connection between the OLD_P port of the old storage device 34 and the HOST_P port of the host device 32.

In some embodiments, it may be possible to use virtual logical ports implemented with N Port ID virtualization (NPIV) where a single physical port may function as a plurality of logical ports. For example, it may be possible to provide OLD_P and OLD_S on the same physical port. As another example, it may be possible to provide multiple OLD_P ports on the same physical port. In some cases, it may be desirable to not mix initiator and target logical ports on the same physical port of the virtualization engine 42 or other devices. In other situations, it may be acceptable to provide initiator and target logical ports on the same physical port.

Figure 4:
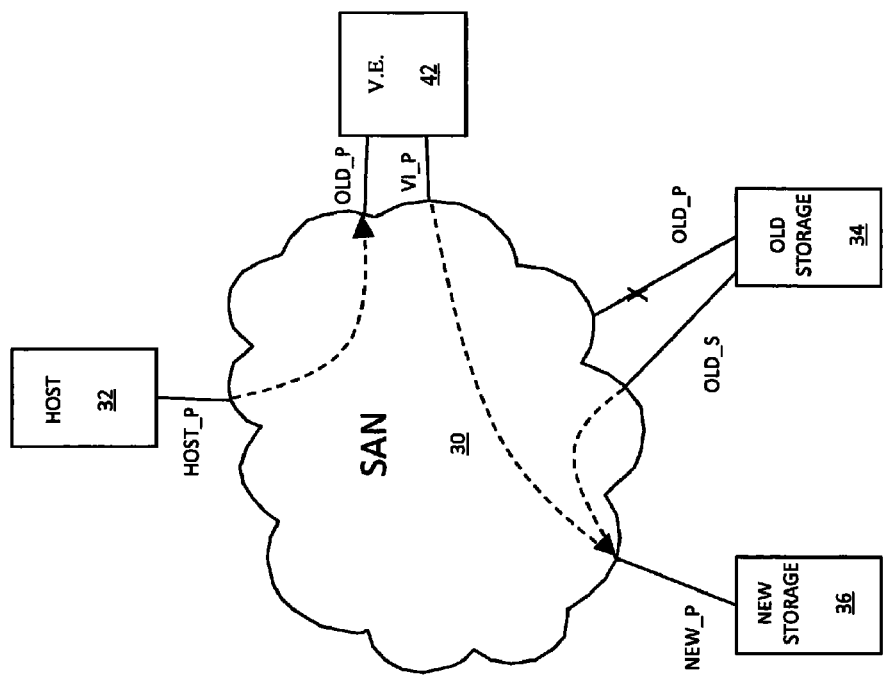
FIG. 4 is a diagram illustrating a storage area network coupled to a host, a new storage device, an old storage device, and a virtualization engine with a data path from the host to the virtualization engine according to the system described herein.

In FIG. 4, the virtualization engine 42 is shown as having a target port OLD_P that has a worldwide port name (WWPN) identical to the OLD_P port of the old storage device 34. The OLD_P port of the virtualization engine 42 is coupled (by, for example, via switch zoning) to the HOST_P port of the host 32 so that I/O operations from the host 32 by at the HOST_P/OLD_P connection (zone) are now provided through the virtualization engine 42. Any I/O operations destined for the OLD_P port of the first storage device 34 go to the OLD_P port of the virtualization engine 42 instead. Operation of the virtualization engine 42 in connection with the configuration illustrated by FIG. 4 is described in more detail elsewhere herein.

Figure 5:
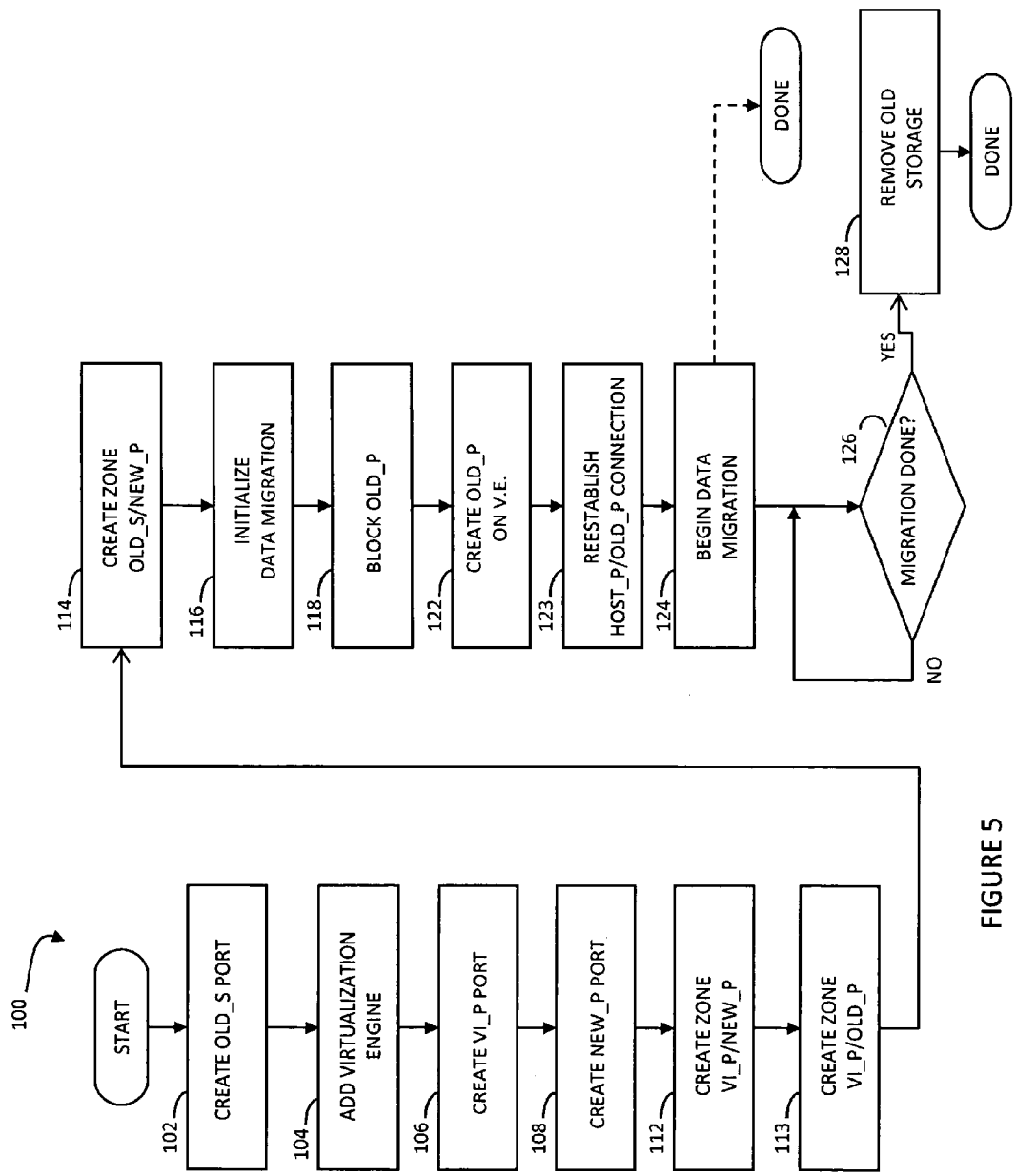
FIG. 5 is a flowchart illustrating steps performed in connection with establishing I/O redirection to a new storage device through a storage area network and a virtualization engine according to the system described herein.

Referring to FIG. 5, a flowchart 100 illustrates steps performed in connection with reconfiguring and redirecting I/O as illustrated in FIGS. 2-4, discussed above. Processing begins at a first step 102 where the OLD_S port is created (initialized) at the old storage device 34. The OLD_S port may be used to facilitate data migration from the old storage device 34 to the new storage device 36. The OLD_S port may have the same visibility as the OLD_P port meaning that the OLD_S port may be used to access the same data on the old storage device 34 as the OLD_P port. This allows the OLD_S port to effectively access and migrate data from the old storage device 34.

Following the step 102 is a step 104 where the virtualization engine 42 is coupled to the storage area network 30. Following the step 104 is a step 106 where the VI_P port is created at the virtualization engine 42. Following the step 106 is a step 108 where the NEW_P port is created on the new storage device 36. Note that, in some cases, it may be necessary or useful to allocate and provision (set up) at the new storage device 36 logical units that correspond to logical units of the old storage device 34 from which data is being migrated. The logical units provisioned on the new storage device 36 may be the same size or bigger than logical units of the old storage device 34.

Following the step 108 is a step 112 where a zone VI_P/NEW_P is created to provide the connection between the VI_P port of the virtualization engine 42 and the NEW_P port on the new storage device 36. Following the step 112 is a step 113 where a zone VI_P/OLD_P is created. The zone VI_P/OLD_P is provided for a temporary connection therebetween to allow the virtualization engine 42 to operate on the old storage device 34 and/or on OLD_P (for discovery purposes). In some cases, it may be possible to eliminate the step 113 in systems where the virtualization engine may manipulate the old storage device 34/OLD_P port without needing to first connect thereto.

Following the step 113 is a step 114 where a zone is created between the OLD_S port on the old storage device 34 and the NEW_P port on the new storage device 36 to provide connection therebetween for data migration. Following the step 114 is a step 116 where data migration is initialized. In an embodiment herein, although data migration is initialized at the step 116, the migration is not begun until later on in the processing. Following the step 116 is a step 118 where the OLD_P port on the old storage device 34 is blocked, thus suspending communication between the host 32 and the old storage device 34.

Following the step 118 is a step 122 where a port with a WWPN of OLD_P (identical to the WWPN of the port on the old storage device 34) is created on the virtualization engine 42. As discussed elsewhere herein, the port on the virtualization engine 42 is provided with the same WWPN (or other appropriate identifier) as the port on the old storage device 34 that was in communication with the host 32. Note also that data-path connections may be facilitated by actions performed by the different devices in connection with initialization I/O operations. For example, blocking the OLD_P port on the old storage device 34 may cause a data disconnect to occur at the HOST_P port of the host 32. The host 32 may then continuously retry the I/O operation until after the OLD_P port is created at the virtualization engine 42, in which case a data reconnect will occur. In some instances, the host may retry I/O operations for a finite period of time (possibly dictated by the operating system) after which retries are no longer attempted. Accordingly, the system described herein is designed to have the host 32 be disconnected for an amount of time that is less than the finite period of time after which retries are no longer attempted.

Following the step 122 is a step 123, where the connection between the HOST_P port (at the host 32) and the OLD_P port (now on the virtualization engine 42) is reestablished. Note that, although processing at the step 123 may cause the host 32 to connect to the virtualization engine 42 for the first time, from the perspective of the host 32, the connection to the OLD_P port is being reestablished since the host 32 had been previously connected to the OLD_P port. Thus, the host 32 experiences a disconnect (at the step 118) and a subsequent reconnect (at the step 123) to what is apparently the same port. Following the step 123 is a step 124 where data migration is initiated. In some embodiments, data migration may be initiated in connection with a first I/O operation from the host 32 to the new storage device 36. In other embodiments, the data migration operation may be begun at any time after the OLD_P port is blocked at the old storage device 34 at the step 118.

In some embodiments, the processing is complete after beginning data migration at the step 124. This is illustrated by the dashed line on the flowchart 100 from the step 124. In other embodiments, further processing may be performed in order to facilitate removal of the old storage device 34. For such embodiments, control transfers from the step 124 to a test step 126, where it is determined if the migration of data from the old storage device 34 to the new storage device 36 is complete. If not, then control transfers back to the step 126 to continue polling until the migration is complete. Although not shown in the flowchart 100, it is possible to provide a delay step along with the polling cycles corresponding to the test step 126.

Once it is determined at the test step 126 that data migration is complete, then control transfers from the test step 126 to a step 128 where the old storage device 34 may be removed from the system. At the step 126, the old storage device 34 may be physically removed from the storage area network 30. Alternatively, the old storage device 34 may be maintained at the same physical location but used for another purpose, in which case OLD_P may remain blocked on the old storage device 34. Following the step 128, processing is complete.

Note that, in some embodiments, data migration may not be necessary and/or desirable. For example, if the affected volume(s) on the new storage device 36 are maintained as mirrors of the volume(s) on the old storage device 34, then the transition may occur without performing data migration. In such a case, operations corresponding to the steps 116, 124, 126 of the flowchart 100 may be eliminated. There may also be other instances where data migration is not necessary and/or desirable.

Figures 6, 7:
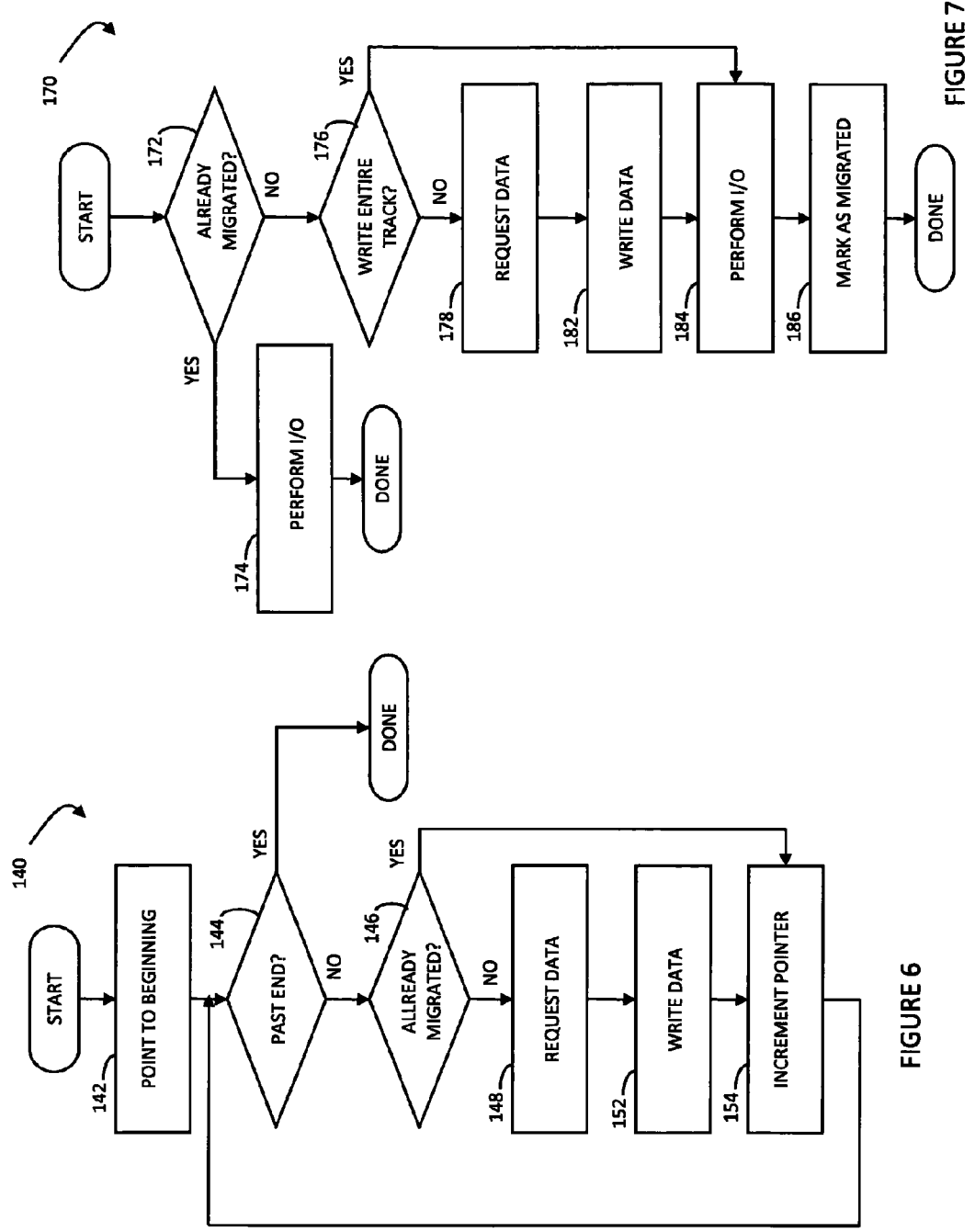
FIG. 6 is a flowchart illustrating data migration from an old storage device to a new storage device according to the system described herein.
FIG. 7 is a flowchart illustrating handling I/O operations during data migration from an old storage device to a new storage device according to the system described herein.

Referring to FIG. 6, a flowchart 140 illustrates steps performed in connection with migrating data from the old storage device 34 to the new storage device 36. Processing begins at a first step 142 where a pointer that is used to iterate through all of the tracks (or blocks, or whatever data increment is moved in one iteration) is made to point to the beginning of the data being migrated. In an embodiment herein, entire logical volumes may be migrated a track at a time so that, at the step 142, the pointer used for migration points to the first track of the logical volume of the old storage device 34. Of course, it will be appreciated by one of ordinary skill in the art that any appropriate increments may be used for migration (e.g., blocks, partial tracks, multiple tracks, variable amounts, etc.) and that it is possible to migrate the entire old storage device 34, one or more logical volumes of the old storage device 34, one or more physical volumes of the old storage device 34, one or more portions of one or more logical volumes of the old storage device 34, and/or one or more portions of one or more physical volumes of the old storage device 34.

Following the step 142 is a test step 144 where it is determined if the pointer that iterates through the logical volume of the old storage device 34 points past the end of the logical volume. If so, then processing is complete and the logical volume has been migrated. Otherwise, control transfers from the test step 144 to a test step 146 where it is determined if the data pointed to by the pointer has already been migrated. As discussed elsewhere herein, it is possible for data to be migrated with processes other than the process illustrated by the flowchart 140, such as in connection with an I/O operation. Any appropriate mechanism may be used to indicate which data of the logical volume has already been migrated. In some cases, metadata for a track (or some other data increment) may directly indicate whether the track has been migrated. Of course, any appropriate mechanism may be used to indicate which data has already been migrated.

If it is determined at the test step 146 that the data pointed to by the pointer that iterates through the logical volume has not already been migrated, then control transfers from the test step 146 to a step 148 where the data is requested from the old storage device 34. The amount of data that is requested at the step 148 depends upon the data increments that are transferred at any one time (one iteration) in connection with the migration and/or on the host requested data size, whichever is greater. In an embodiment herein, a track's worth of data is requested at the step 148. Following the step 148 is a step 152 where the data obtained from the old storage device 34 at the step 148 is written to the new storage device 36 at a corresponding location (e.g., same relative track position). Writing the data at the step 152 also includes marking the data as already migrated using the appropriate mechanism to indicate which data has already been migrated. Following the step 152 is a step 154 where the pointer used to iterate through the logical volume being migrated is incremented. Following the step 154, control transfers back to the test step 144 for the next iteration. Note that it is possible to have the virtualization engine 42, the old storage device 34, the new storage device 36, a separate device (not shown) or any combination thereof perform the steps illustrated by the flowchart 100 of FIG. 5.

If it is determined at the test step 146 that the data pointed to by the pointer that iterates through the logical volume has already been migrated, then control transfers from the test step 146 to the step 154 to prepare for the next iteration. Instances where data may have already been migrated by a process other than the process illustrated by the flowchart 140 are discussed in more detail elsewhere herein.

Referring to FIG. 7, a flowchart 170 illustrates steps performed in connection with an I/O operation provided by the host device 32 during data migration from the old storage device 34 to the new storage device 36. Processing begins at a first step 172 where it is determined if the data being affected by the I/O operation has already been migrated. If so, then controlled transfers from the test step 172 to a step 174 where the I/O operation is performed in a conventional fashion (but using the new storage device 36 and the virtualization engine 42 in a way that is transparent to the host 32). Following the step 174, processing is complete.

If it is determined at the test step 172 that the data being affected by the I/O operation has not already been migrated, then control transfers from the test step 172 to a test step 176 where it is determined if the I/O operation writes an entire track's worth of data (or whatever increment is provided in a single migration iteration). Note that if the migration operation illustrated by the steps of the flowchart 140 migrates an increment that is different from a track, then the test at the step 176 may be adjusted accordingly to determine, generally, if the I/O operation writes an amount of data equal to the increment of data migrated at each iteration of the migration operation. Note that if the I/O operation writes an entire track's worth of data (or other appropriate increment), then it is not necessary to migrate any data prior to writing the entire track.

If it is determined at the test step 176 that the I/O operation does not write an entire full track of data (or some other increment), then control transfers from the test step 176 to a step 178 where a track (or other increment) of data is requested from the old storage device 34. Following the step 178 is a step 182 where the data obtained from the old storage device at the step 178 is written to the new storage device 36. Following the step 182 is a step 184 where the I/O operation of the host 32 is performed at the new storage device 36. Following the step 184 is a step 186 where the track written at the step 184 is marked as a migrated using whatever mechanism the system uses to indicate which tracks have been migrated. Following the step 186, processing is complete.

Figure 8:
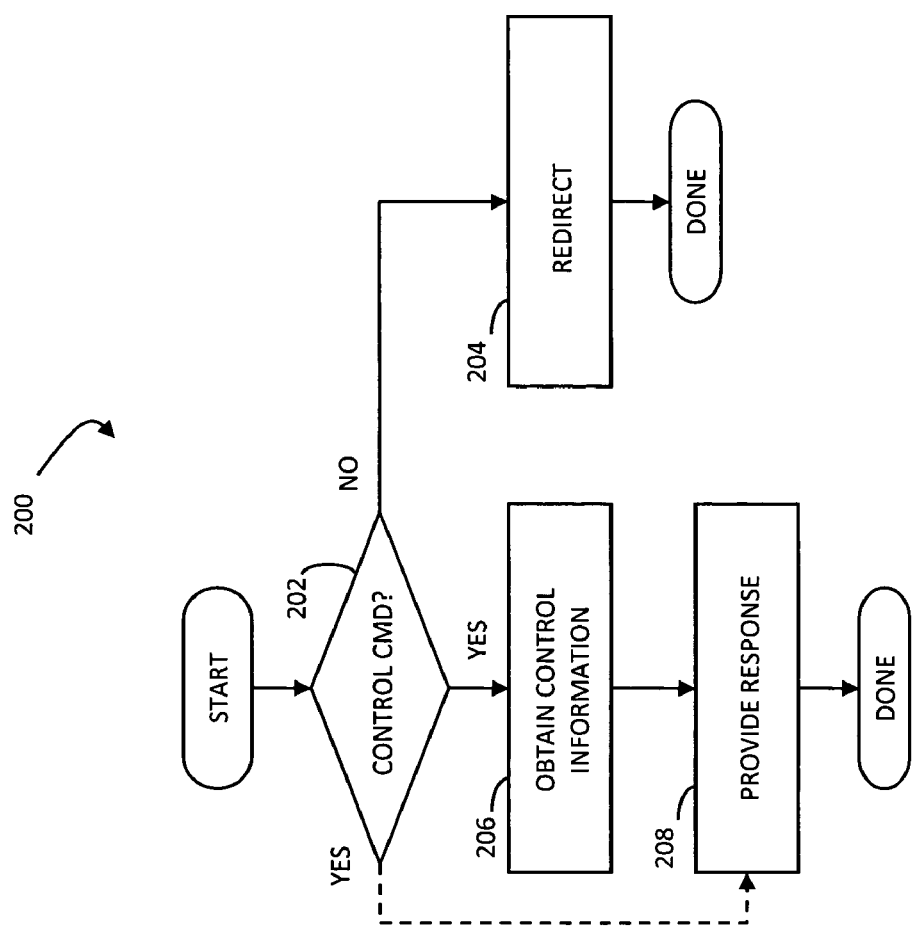
FIG. 8 is a flowchart illustrating steps performed in connection with handling command/status requests and data I/O requests in connection with I/O redirection according to the system described herein.

Referring to FIG. 8, a flowchart 200 illustrates steps that are performed in connection with the virtualization engine 42 servicing data I/O requests as well as command/status requests that are initially destined by the host 32 for the first storage device 34. Processing begins at a first step 202 where it is determined if the I/O operation from the host 32 is a control/status request. If not, then the request is a data I/O request, in which case control transfers from the step 202 to a step 204 where the I/O is redirected by the virtualization engine 42 to the new storage device 36 using the VI_P/NEW_P connection. Note that redirection may only occur if the data I/O from the host 32 is generated to a destination that has been already mapped in the virtualization engine 42. If the mapping does not exist, the I/O may be handled the same way as a command/status I/O.

In some embodiments, the processing illustrated by the steps 202, 204 may be performed by the hardware. For example, the Emulex products discussed above that may be used for the virtualization engine 42 provide a split path architecture that allows data I/O requests to be redirected with relatively little latency when compared with systems that sort data and command/status requests using a conventional processor. The Emulex hardware automatically redirects mapped data I/O requests without further processing outside the hardware.

If it is determined at the test step 202 that the request is a control/status request, then control transfers from the test step 202 to a step 206 where the control/status information needed to service the request is obtained from the old storage device 34. In other embodiments, the control/status information needed to service the requests may be provided from one or more pre-initialized locations within the virtualization engine. Information may be obtained in any appropriate fashion, such as a connection through the storage area network 30 between the virtualization engine 42 and the old storage device 34 (connection not shown in Figures) and/or by a direct connection between the virtualization engine 42 and the old storage device 34 (connection not shown in Figures). Following the step 206 is a step 208 where the response is provided to the host device 32. As discussed elsewhere herein, the response provided to the host device 32 is designed to be identical (or nearly identical, as appropriate) to the response the host device 32 would have received had there not been a redirection to the new storage device 36. Following the step 208, processing is complete.

In some embodiments, it is possible that part of the system initialization process includes having the virtualization engine 42 receive status information from the old storage device 34, which the virtualization engine 42 saves in order to be able to respond to future control/status requests. Data for answering any control/status requests that may be posed by the host 32 are already stored by the virtualization engine 42 and thus it is not necessary to obtain any information at the step 206. This embodiment is illustrated by an alternative path from the test step 202 to the step 208, illustrated by a dashed line. Note that when the old storage device 34 is removed from the storage area network 30, control/status requests are not redirected to the old storage device 34.

In some instances, it may be desirable to integrate the functionality of the virtualization engine into the new storage device to eliminate the need for a separate external virtualization engine coupled to the storage area network. In such a case, the new storage device may connect to the storage area network using a port having an identifier that corresponds to the identifier previously used by the old storage device to connect to the storage area network.

Figure 9:
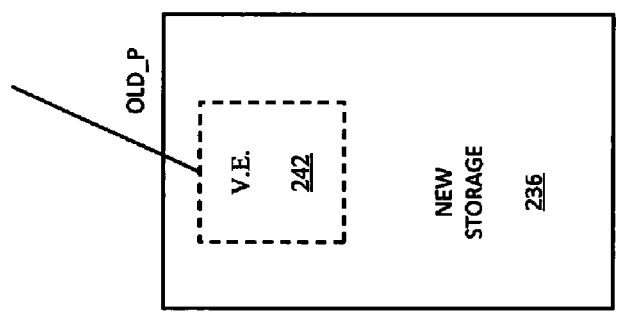
FIG. 9 is a diagram illustrating a new storage device having virtualization engine functionality integrated therewith according to the system described herein.

Referring to FIG. 9, a new storage device 236 is shown having a virtualization engine 242 (virtualization engine functionality) integrated therewith. The new storage device 236 has a port with a WWPN of OLD_P, which is identical to the WWPN of the port of an old storage device (not shown in FIG. 9) from which data is being migrated. As explained in more detail below, the system transitions a host (not shown in FIG. 9) from communicating with the old storage device to communicating with the new storage device 236 in a way that is transparent to the host. The new storage device 236 appears to the host to be the old storage device. The virtualization engine functionality may be provided to the new storage device 236 using an Emulex AV150 ASIC on an AD1500 board, an Emulex Raptor ASIC on an AD2500 board and/or any other appropriate technology.

Figure 10:
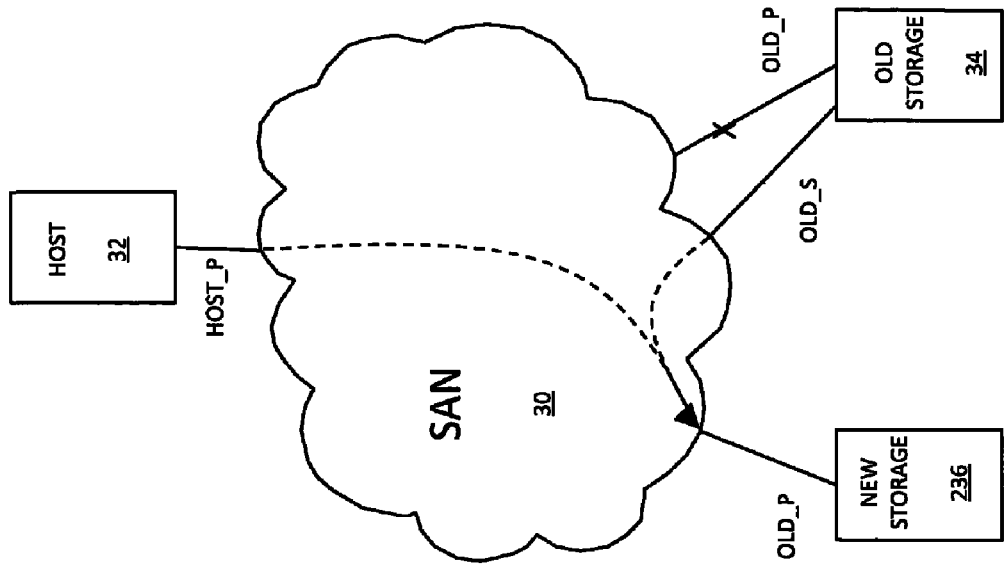
FIG. 10 is a diagram illustrating a storage area network coupled to a host, a new storage device, and an old storage device, with a data path from the host to the new storage device according to the system described herein.

Referring to FIG. 10, a diagram illustrates the storage area network 30, with the host 32 coupled thereto via the port having a WWPN of HOST_P, as discussed above (see FIGS. 2-4). The old storage device 34 is also coupled to the storage area network 30. As shown in FIG. 10, the old storage device 34 has a port with a WWPN of OLD_P, which is shown as blocked, but which had been previously used by the host 32 to communicate with the old storage device 34 (see, for example, the initial system state illustrated by FIG. 2). The old storage device 34 also has a data port with a WWPN of OLD_S, which is coupled to the storage area network 30.

The new storage device 236 is coupled to the storage area network 30 by a port having a WWPN of OLD_P (the WWPN of the port previously used by the old storage device 34). The storage area network 30 establishes a first communication path from the HOST_P port of the host 32 to the OLD_P port of the new storage device 236 to facilitate redirection of I/O operations by the host 32 to the new storage device 236. The storage area network 30 establishes a second communication path from the OLD_S port of the old storage device 34 to the OLD_P port of the new storage device 236 to facilitate migrating data from the old storage device 34 to the new storage device 236. Transitioning from the initial state illustrated by FIG. 2 to the final state illustrated by FIG. 10 is described in more detail below.

Figure 11:
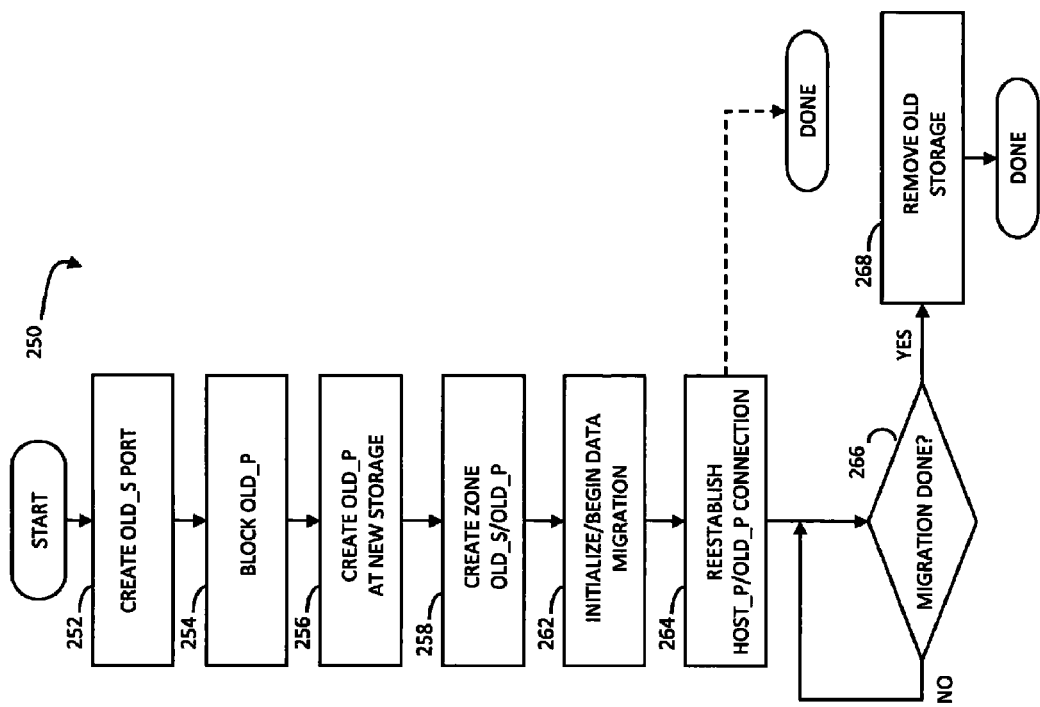
FIG. 11 is a flowchart illustrating steps performed in connection with establishing I/O redirection to a new storage device through a storage area network according to the system described herein.

Referring to FIG. 11, a flowchart 250 illustrates steps performed in connection with transitioning the host 32 from using the old storage device 34 to using the new storage device 236 and initiating a data migration from the old storage device 34 to the new storage device 236. As discussed elsewhere herein, the transition from using the old storage device 34 to using the new storage device 236 is designed to be transparent to the host 32. Many of the steps of the flowchart 250 are like steps of the flowchart 100 of FIG. 5, discussed above.

Processing begins at a first step 252 where the OLD_S port is created on the old storage device 34. Following the step 252 is a step 254 where the OLD_P port on the old storage device 34 is blocked. Following the step 254 is a step 256 where the OLD_P port is created at the new storage device. Following the step 256 is a step 258 where a zone OLD_S/OLD_P is created. The connection between OLD_S at the old storage device 34 and OLD_P at the new storage device 236 is used to facilitate data migration from the old storage device 34 to the new storage device 236.

Following the step 258 is a step 262 where the system initializes and begins data migration from the old storage device 34 (port OLD_S) to the new storage device (port OLD_P). Following the step 262 is a step 264 where the connection between the HOST_P port (at the host 32) and the OLD_P port (now on the new storage device 236) is reestablished. Note that, although processing at the step 264 may cause the host 32 to connect to the new storage device 236 for the first time, from the perspective of the host 32, the connection to the OLD_P port is being reestablished since the host 32 had been previously connected to the OLD_P port. Thus, the host 32 experiences a disconnect (at the step 254) and a subsequent reconnect (at the step 264) to what is apparently the same port.

In some embodiments, processing is complete following the step 264. In other embodiments where the old storage device is being disconnected from the storage area network 30, processing proceeds from the step 264 to a test step 266 where it is determined if the data migration is complete. As with the step 126 of the flowchart 100 of FIG. 5, the system continues to poll until the migration is done, following which control transfers to the step 268 where the old storage device 34 may be disconnected from the storage area network 30. Following the step 268, processing is complete.

Note that integrating the virtualization engine functionality with the new storage device 236 does not appreciably alter the data migration illustrated by the flowchart 140 of FIG. 6, handling I/O operations during migration illustrated by the flowchart 170 of FIG. 7, and handling control/status requests illustrated by the flowchart 200 of FIG. 8. In an embodiment herein, it is possible that part of the system initialization process includes having the new storage device 236 receive status information from the old storage device 34, which the new storage device 236 saves in order to be able to respond to future control/status requests. Data for answering any control/status requests that may be posed by the host 32 are already stored by the new storage device 236. In other embodiments, control/status requests may be redirected to the old storage device 34. However, in instances where the old storage device 34 is removed from the storage area network 30, control/status requests may not be redirected to the old storage device 34. As with the virtualization engine 42, the new storage device 236 may contain hardware that automatically remaps appropriate I/O operations.

In another embodiment, the system described herein may use virtual storage networks (VSANs). A VSAN is a particular section of a storage area network that has been partitioned into logical sections. The use of VSANs allows traffic to be isolated within specific portions of the network. If a problem occurs in one VSAN, that problem can be handled with a minimum of disruption to the network. The use of multiple VSANs may make a system easier to configure because subscribers may be added or relocated without the need for changing the physical layout. VSANs may also be configured separately and independently. As will be apparent from the discussion below, use of the VSANs eliminates the need to provide a secondary port (e.g., OLD_S) on the old storage device in order to facilitate the migration. Also, use of the VSANs eliminates the need to block the primary port (OLD_P) on the old storage device.

Figure 12:
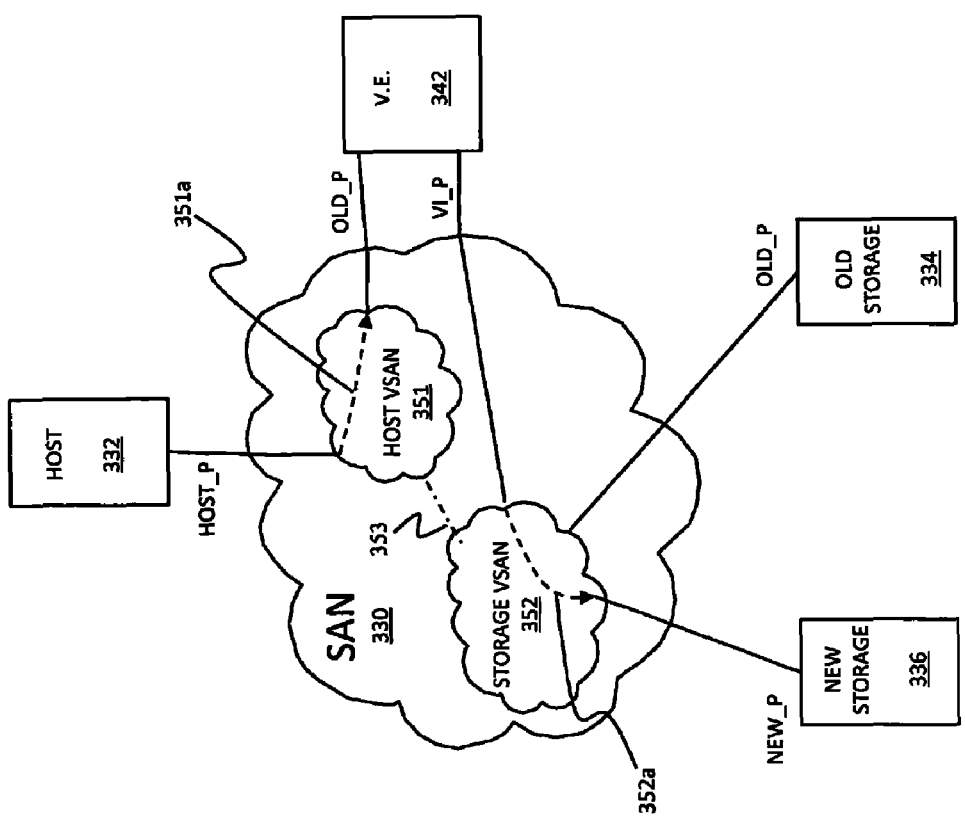
FIG. 12 is a schematic illustration showing a system for non-disruptive data mobility via split path virtualization according to an embodiment of the system described herein including a host, an old storage device, a new storage device, and a storage area network including two virtual storage area networks.

FIG. 12 is a schematic illustration showing a system for non-disruptive data mobility via split path virtualization including a host 332, an old storage device 334, a new storage device 336, and a storage area network 330 having two VSANs, a Host VSAN 351 and a Storage VSAN 352, that have been created in the storage area network 330. The host port HOST_P of the host 332 may be coupled to the Host VSAN 351 and the Host VSAN 351 may be coupled to the virtual target (VT) OLD_P port of a virtualization engine 342, as discussed elsewhere herein. The virtualization engine 342 is shown as an external device; however, as further discussed elsewhere herein, the virtualization engine 342 may also be integrated into components of the system, for example, into the new storage device 336. A communication path is shown between the host 332 and the virtualization engine 342 as a dashed path 351a in the Host VSAN 351. The VSANs 351, 352 are isolated from one another; however, a connection 353 schematically illustrates a configuration for Inter-VSAN routing (IVR), in which the Host port HOST_P is (temporarily) allowed to provide I/O across the isolated VSANs 351, 352 to the OLD_P port of the old storage device 334 before initiation of the virtualization engine 342.

The OLD_P port of the old storage device 334 may be coupled to the Storage VSAN 352 and the NEW_P port of the new storage device 336 may also be coupled to the Storage VSAN 352. The initiator port VI_P of the virtualization engine 342 is also coupled to the Storage VSAN 352. The virtualization engine 342 may create virtual logical unit numbers (vLUNs) that are mapped to the physical LUNs (pLUNs) of the old storage device 334. As further discussed elsewhere herein, the virtualization engine 342 may also include a volume map that maps the vLUNs of the virtualization engine 342 to the pLUNs of the new storage device 336 such that I/O from and to the host may be seamlessly performed with the new storage device 336 and may be synchronized with the old storage device 334. In the embodiment illustrated in FIG. 12, a communication zone between the initiator port VI_P of the virtualization engine 342 and the port NEW_P of the new storage device 336 is shown as a dashed path 352a in the Storage VSAN 352. Accordingly, I/O of the host 332 is communicated between the host 332 and the new storage device 336 according to the system described herein, without affecting the storage pathing information of the host.

Figure 13:
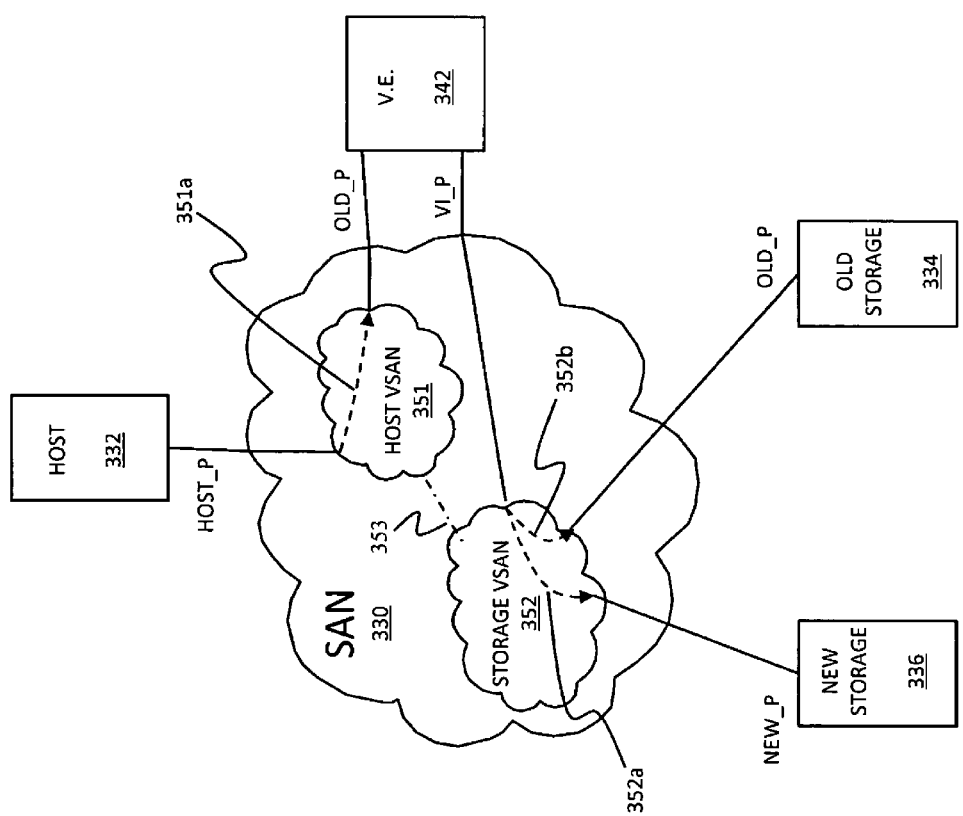
FIG. 13 is a schematic illustration showing a system like that shown in FIG. 12 and further illustrating a zone established between the VI_P port of the virtualization engine and the OLD_P port of the old storage device.

FIG. 13 is a schematic illustration showing a system like that shown in FIG. 12 and further illustrating a zone established between the VI_P port of the virtualization engine and the OLD_P port of the old storage device 342, shown as a dashed path 352b in the Storage VSAN 352. In the illustrated embodiment, the system described herein provides for split-path virtualization in data mobility of the host I/O to both the old storage device 334 and the new storage device 336.

Figure 14:
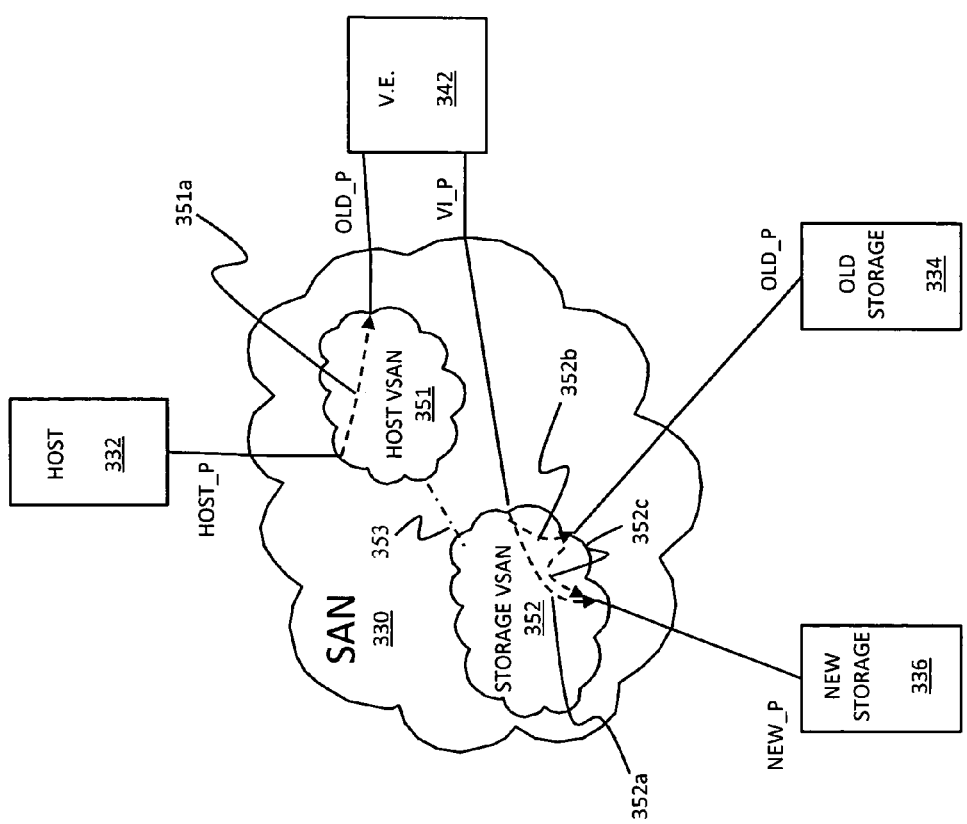
FIG. 14 is a schematic illustration showing a system like that shown in FIG. 13 and further illustrating a data migration path between the OLD_P port of the old storage device and the NEW_P port of the new storage device.

FIG. 14 is a schematic illustration showing a system like that shown in FIG. 13 and further illustrating a data migration path between the OLD_P port of the old storage device 334 and the NEW_P port of the new storage device 336, shown as a dashed path 352c in the Storage VSAN 352. In the illustrated embodiment, the system described herein provides for data synchronization between the old storage device 334 and the new storage device 336.

In various embodiments, the new storage device 336 may be a Symmetrix device and/or the old storage device may be a CLARiiON device, both produced by EMC Corporation. Other storage arrays may be used in connection with the system described herein. Further, the new storage device 336 may optionally include a gatekeeper port that is coupled to the Host VSAN 351 that may help the host server to create and activate data migrations and allow communication of the host 332 with the new storage device 336.

Procedures to generate the operational states shown in FIGS. 12, 13 and 14 are discussed elsewhere herein. In the above-noted system, the host-storage pathing information may remain unchanged, and the host 332 may be unaffected by the transition of I/O from addressing the physical LUN of the old storage device 334 to addressing the virtual LUNs provided by the virtualization engine 342, and which in turn allows I/O to the new storage device 336 and/or synchronization of the new storage device 336 and the old storage device 334 without affecting the host.

Figure 15:
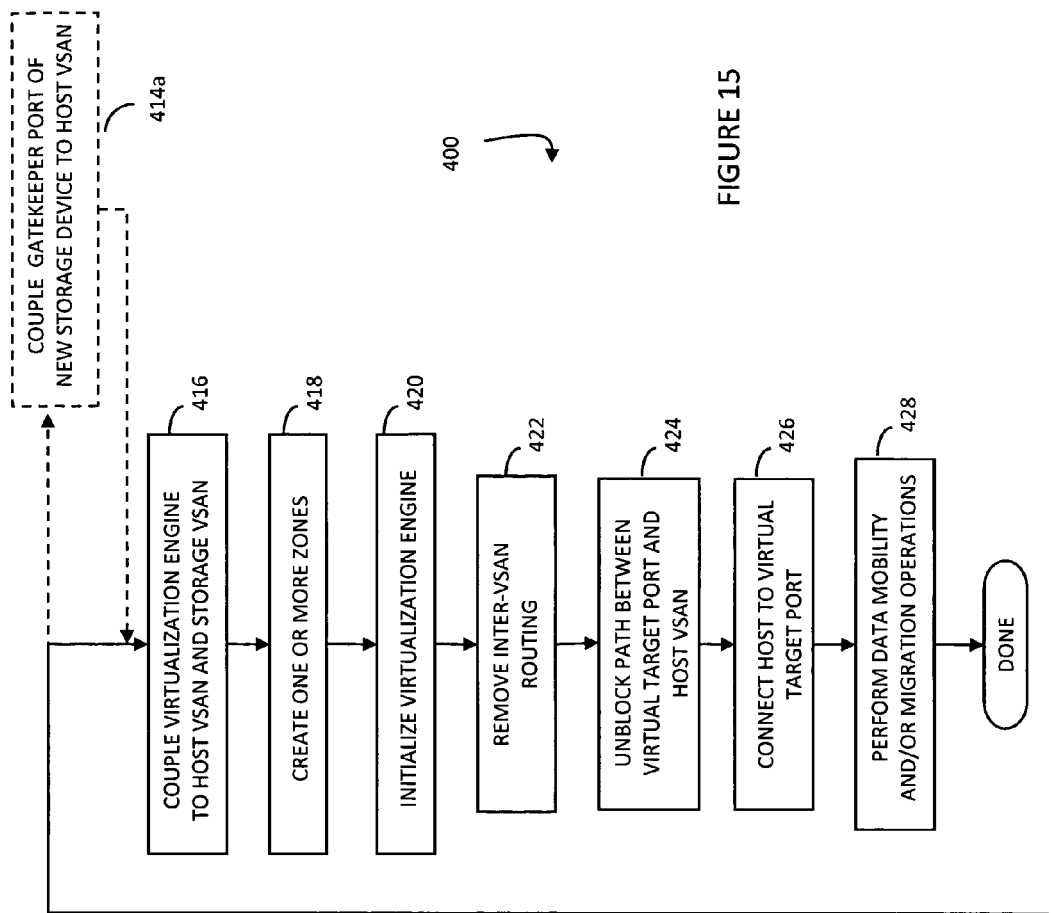
FIG. 15 is a flowchart showing non-disruptive data mobility processing using VSANs according to an embodiment of the system described herein.
Figure 15:
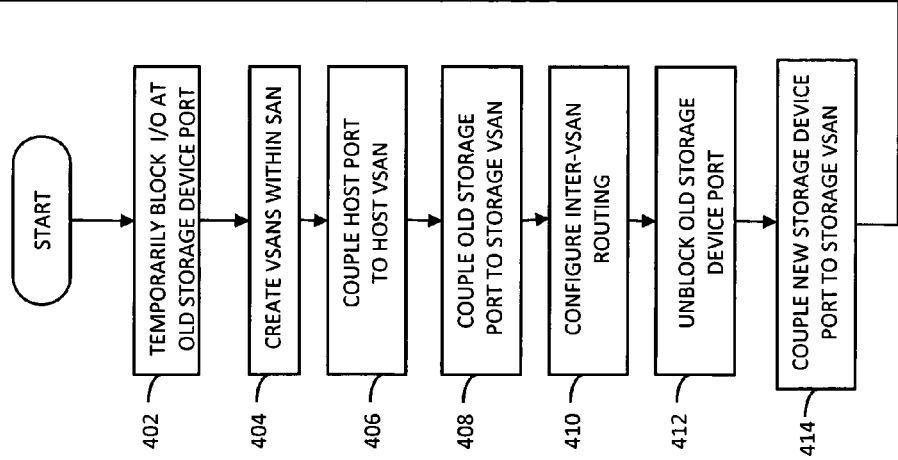

FIG. 15 is a flowchart 400 showing non-disruptive data mobility processing using VSANs according to an embodiment of the system described herein. At a step 402, I/O from the host 332 to the old storage device 334 through the SAN 330 is temporarily blocked to halt I/O to the old storage device 334. Note that blocking the I/O path may be performed by a switch in the SAN 330 and/or in the old storage device 334. After the step 402, processing proceeds to a step 404 where the Host VSAN 351 and the Storage VSAN 352 are created within the SAN 330. After the step 404, processing proceeds to a step 406 where the port of the host 332 is coupled to the Host VSAN 351. After the step 406, processing proceeds to a step 408 where the port of the old storage device 334 is coupled to Storage VSAN 352. Note that immediately following the step 408, I/O to the old storage device 334 may still be blocked.

After the step 408, processing proceeds to a step 410 where inter-VSAN routing (IVR) 353 is configured to allow the host 332 to drive I/O across the VSANs 351, 352 to the port of the old storage device 334. After the step 410, processing proceeds to a step 412 where the port of the old storage device 334 is unblocked to allow I/O to resume between the host 332 and the old storage device 334. After the step 412, processing proceeds to a step 414 where a data port of the new storage device 336 is coupled to the Storage VSAN 351. Note, optionally, at a step 414a, a gatekeeper port of the new storage device 336 may be coupled to the Host VSAN 351 that allows communication of the host 332 with the new storage device 336 to create and activate a migration session. As discussed elsewhere herein, however, it is also possible for all commands to the new storage device 336 and to the old storage device 334 to be eventually outed through the virtualization engine 342.

After the step 414, processing proceeds to a step 416 where the virtualization engine 342 is coupled to the SAN 330 via a virtual target port, initially blocked, coupled to the Host VSAN 351 and via a virtual initiator port coupled to the Storage VSAN 352. After the step 416, processing proceeds to a step 418 where one or more zones are created to allow data transfer from the virtual initiator port of the virtualization engine 342 to the ports of the new storage device 336 and/or the old storage device 334. Note that, in the illustrated embodiment, zones may be created from the virtualization engine 342 to both the new storage device 336 and the old storage device 334 to allow data migration and/or synchronization; however, it is also possible to only establish a zone to allow data transfer between the virtualization engine 342 and the new storage device 336, for example, if no further data is to be written to the old storage device 334, as further discussed elsewhere herein.

After the step 418, processing proceeds to a step 420 where the virtualization engine 342 is initialized. Initialization of the virtualization engine 342 may include first configuring the virtual target port of the virtualization engine 342 with a WWPN that matches that of the port of the old storage device 334. Virtual LUNs may then be created at the virtualization engine 342 that are mapped to the physical LUNs of the old storage device 334 and with extents that match the physical LUNs of the old storage device 334, and which may be provided with the correct read/write attributes. The virtual target port of the virtualization engine 342 may be exposed to the port of the host 332, but the path between the virtual target port and the port of the host 332 may remain blocked. After the step 420, processing may proceed to a step 422 where the IVR is removed to block the host I/O path through the VSANs 351, 352. After the step 422, processing proceeds to a step 424 where the path between the virtual target port of the virtualization engine 342 and the Host VSAN 351 is unblocked. After the step 424, processing proceeds to a step 426 where the host 332 connects to the virtual target port of the virtualization engine 342 that has the same WWPN as the port of the old storage device 334, which allows the host to issue I/Os to the virtual LUNs of the virtualization engine 342 but believing that it is issuing I/Os to the physical LUNs of the old storage device 334. After the step 426, processing proceeds to a step 428 where data mobility and/or migration operations occurs, various embodiments of which are further discussed elsewhere herein and may be performed individually or in combination. After the step 428, processing is complete.

FIG. 16 is a flowchart 428a showing an embodiment of non-disruptive data mobility in connection with the above-noted steps of FIG. 15 according to the system described herein. At a step 432, a zone is established, or otherwise identified, for a communication path between the VI_P port of the virtualization engine 342 and the NEW_P port of the new storage device 336. After the step 432, processing proceeds to a step 434 where a volume map of the virtualization engine 342 is modified so that access by the host 332 to the virtual LUNs of the virtualization engine 342 maps to the physical LUNs of the new storage device 336. After the step 434, processing may proceed to an step 436 where I/O operations of the host 332 are directed to the new storage device 336 via the two VSANs 351, 352 and the virtualization engine 342 without affecting host-storage pathing information of the host 332. In various embodiments, the old storage device 334 is remained connected to the SAN 330, as further discussed elsewhere herein, or may optionally be disconnected from the SAN 330. After the step 436, processing is complete.

FIG. 17 is a flowchart 428b showing an embodiment of non-disruptive data mobility and migration with split path virtualization in connection with the above-noted steps of FIG. 15 according to the system described herein. At a step 442, two zones are established, or otherwise identified, for a data transfer path between the VI_P port of the virtualization engine 342 and the NEW_P port of the new storage device 336 and a data transfer path between the VI_P port of the virtualization engine 342 and the OLD_P port of the old storage device 334. After the step 442, processing proceeds to a step 444 where a volume map of the virtual LUNs of the virtualization engine 342 is modified to map to one or more physical LUNs of the old storage device 334 and the new storage device 336 in a split path data mobility virtualization. After the step 444, processing is complete.

FIG. 18 is a flowchart 428c showing an embodiment of non-disruptive data migration in connection with the above-noted steps of FIG. 15 according to the system described herein. At a step 452, a data migration zone is created between the OLD_P port of the old storage device 334 and the NEW_P port of the new storage device 336. After the step 452, processing proceeds to a step 454 where a data migration state is initialized between the new storage device 336 and the old storage device 334. For example, the new storage device 336 may initialize and activate the data migration state, which may be initialized to a paused state. After the step 454, processing proceeds to a step 456 where a data migration cycle is initiated to migrate data from the old storage device 334 to the new storage device 336. In an embodiment, the data migration cycle may be triggered by the first host I/O that is addressed to the new storage device 336 via the virtualization engine 342. After the step 456, processing proceeds to a step 458 where the data migration cycle is ended once the required data has been migrated from the old storage device 334 to the new storage device 336. After the step 458, processing is complete.

The above-noted embodiments may operate in connection with one another. For example, the system described herein may allow for data synchronization between the old storage device and the new storage device in which case data is migrated from the old storage device to the new storage and subsequent host I/Os access both the old storage device and the new storage device. In an embodiment, one of the running host applications may require data resident on the old storage device to be moved to a higher tier storage array of the new storage device for better performance and protection. The above-noted operations are performed and the old storage device is retained as a storage asset and kept synchronized with the new storage device so that the host may access it again as a lower-tier storage array in the future.

In various embodiments, the device and software combinations of the system described herein may create a SAN centric storage virtualization layer in front of the storage devices. The system allows data mobility and migration without disruption to one or more host servers attached to the SAN. Specifically, the host servers are not disrupted when switching I/Os between physical and virtual storage by taking advantage of WWPN spoofing and Fibre Channel VSAN technology. The use of VSANs effectively allow multiple virtual directors and/or switches to be created within a physical director and/or switch each with their own separate name server, thereby providing complete isolation from one another. The host-storage pathing information, as used in host based multi-pathing software prevalent in enterprise systems is unchanged as the original physical storage port's WWPNs and device identifiers are spoofed by the virtual storage port. The result is two identical WWPNs within the SAN (the original physical WWPN and the newly created virtual WWPN) which is, under normal circumstances, disallowed within a SAN; however, by separating the physical port WWPN into one VSAN and the virtual port WWPN into another VSAN, the restriction may be cleanly circumvented.

As further discussed elsewhere herein, it is advantageous for a host to retain its original pathing information in order to seamlessly transition I/O from a physical LUN to a virtual LUN without the host's knowledge. Furthermore, little or no host administration is required prior to switching between physical and virtual LUNs, which reduces costs especially when many host servers are involved (e.g., hundreds or thousands of host servers).

The system described herein provides non-disruptive virtualization and data migration. Control may be retained within a storage device familiar to a user, such as Symmetrix by EMC Corporation, thereby providing a familiar interface. The system described herein takes advantage of a split-path architecture which improves little or no performance overhead in terms of I/O rate, data throughput and latency. The architecture may also scale up to demands imposed by enterprise environments. Further, the virtualization layer is additive to the existing storage area network and does not disturb existing host and storage port connections.

Additionally, the system described herein supports Information Lifetime Management (ILM) functionality, for example, through data migration from a faster storage device (e.g., an upper-tiered storage array, such as a Symmetrix device from EMC Corporation) to a slower storage device (e.g., a lower-tiered storage array). The lower-tiered storage array may be front-ended by the virtualization layer of the system described herein which spoofs the original upper-tiered storage array's WWPN, so the host still thinks the data resides on the upper-tier storage array, but, in reality, the data is mapped to the lower-tiered storage array. By utilizing VSAN separation of physical and virtual ports, removal of devices having identical WWPNs is no longer required, thereby allowing existing storage assets to be maximized.

Furthermore, the system described herein provides for a technique of open replication in which, for example, a single write from a host may be written to both the old and new storage devices while data migration may occur between the old and new storage devices. Open replication may be a customizable feature controlled by a user and for example may be shut off at any time at the option of the user. It should also be noted that if the old storage device is no longer desired then the old storage device may be removed. In which case, the two VSANs may then be collapsed into a single SAN and operate as discussed elsewhere herein.

The system described herein does not depend upon any particular protocol used for establishing ports, establishing connections between ports, and disconnecting and reconnecting data paths between the ports. Accordingly, the system described herein may use any appropriate protocol/syntax.

Although the system described herein uses tracks as a unit of data for certain purposes, it should be understood that other units of data (including, possibly, variable length units of data) may be used. This also applies to other data structures and data units. In addition, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, stored in a computer-readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method for providing non-disruptive data mobility in connection with a first storage device coupled to a storage area network and a second storage device coupled to the storage area network, the method comprising:
  blocking I/O operations for a first port of the first storage device coupled to the storage area network, wherein the first port is associated with a first identifier;
  creating a first virtual storage area network and a second virtual storage area network within the storage area network;
  coupling the first storage device to the second virtual storage area network via the first port of the first storage device having the first identifier;
  coupling the second storage device to the second virtual storage area network via a first port of the second storage device having a second identifier different from the first identifier;
  coupling a virtualization engine to the first virtual storage area network via a first port of the virtualization engine that is associated with the first identifier;
  coupling the virtualization engine to the second virtual storage area network via a second port of the virtualization engine;
  after creating the first virtual storage area network and the second virtual storage area network, unblocking the I/O operations for the first port of the first storage device; and
  after unblocking the I/O operations for the first port of the first storage device, causing at least a portion of I/O operations received by the virtualization engine through the first port thereof to be routed through the second port thereof to both the first port of the first storage device and the first port of the second storage device via a plurality of data paths established in the second virtual storage area network, wherein the virtualization engine controls directing of the at least a portion of I/O operations via a first data transfer path in the second virtual storage area network to the first storage device and via a second data transfer path in the second virtual storage area network to the second storage device.

2. The method according to claim 1, further comprising:
  configuring inter-virtual storage area network routing to allow driving of I/O operations across the first and second virtual storage area networks.

3. The method according to claim 2, further comprising:
  removing the inter-virtual storage area network routing before causing the I/O operations received by the virtualization engine to be routed to the second virtual storage area network.

4. The method according to claim 1, further comprising:
  causing the at least a portion of I/O operations routed from the virtualization engine to the second virtual storage area network to be routed through the second virtual storage area network to the first port of the second storage device.

5. The method according to claim 4, further comprising:
  causing the at least a portion of I/O operations routed from the virtualization engine to the second virtual storage area network to be routed through the second virtual storage area network to the first port of the first storage device.

6. The method according to claim 1, further comprising:
  causing data to be migrated from the first storage device to the second storage device via a third data transfer path in the second virtual storage area network.

7. The method according to claim 1, further comprising:
  mapping virtual logical unit numbers of the virtualization engine to physical logical unit numbers of at least one of: the first storage device and the second storage device.

8. The method according to claim 1, wherein the identifiers associated with the ports are worldwide port names.

9. The method according to claim 1, wherein the storage area network provides fibre channel connections.

10. Computer software, stored on a non-transitory computer-readable medium, that provides non-disruptive data mobility in connection with a first storage device coupled to a storage area network and a second storage device coupled to the storage area network, the computer software comprising:
  executable code that blocks I/O operations for a first port of the first storage device coupled to the storage area network, wherein the first port is associated with a first identifier;
  executable code that creates a first virtual storage area network and a second virtual storage area network within the storage area network;
  executable code that couples the first storage device to the second virtual storage area network via the first port of the first storage device having the first identifier;
  executable code that couples the second storage device to the second virtual storage area network via a first port of the second storage device having a second identifier different from the first identifier;
  executable code that couples a virtualization engine to the first virtual storage area network via a first port of the virtualization engine that is associated with the first identifier;
  executable code that couples the virtualization engine to the second virtual storage area network via a second port of the virtualization engine;
  executable code that, after creating the first virtual storage area network and the second virtual storage area network, unblocks the I/O operations for the first port of the first storage device; and
  executable code that, after I/O operations for the first port of the first storage device are unblocked, causes at least a portion of I/O operations received by the virtualization engine through the first port thereof to be routed through the second port thereof to both the first port of the first storage device and the first port of the second storage device via a plurality of data paths established in the second virtual storage area network, wherein the virtualization engine controls directing of the at least a portion of I/O operations via a first data transfer path in the second virtual storage area network to the first storage device and via a second data transfer path in the second virtual storage area network to the second storage device.

11. The computer software according to claim 10, further comprising:
  executable code that configures inter-virtual storage area network routing to allow driving of I/O operations across the first and second virtual storage area networks;
  executable code that removes the inter-virtual storage area network routing before causing the I/O operations received by the virtualization engine to be routed to the second virtual storage area network.

12. The computer software according to claim 10, further comprising:
  executable code that causes the at least a portion of I/O operations routed from the virtualization engine to the second virtual storage area network to be routed through the second virtual storage area network to the first port of the second storage device.

13. The computer software according to claim 12, further comprising:

executable code that causes the at least a portion of I/O operations routed from the virtualization engine to the second virtual storage area network to be routed through the second virtual storage area network to the first port of the first storage device.

14. The computer software according to claim 10, further comprising:
executable code that causes data to be migrated from the first storage device to the second storage device via a third data transfer path in the second virtual storage area network.

15. The computer software according to claim 10, further comprising:
executable code that maps virtual logical unit numbers of the virtualization engine to physical logical unit numbers of at least one of the first storage device and the second storage device.

16. The computer software according to claim 10, wherein the identifiers associated with the ports are worldwide port names.

17. A system for providing non-disruptive data mobility, comprising:
a storage area network including a first virtual storage area network and a second virtual storage area network;
a first storage device coupled to the second virtual storage area network via a first port of the first storage device associated with a first identifier;
a second storage device coupled to the second virtual storage area network via a first port of the second storage device associated with a second identifier different from the first identifier;
a virtualization engine coupled to the first virtual storage area network via a first port of the virtualization engine associated with the first identifier and coupled to the second virtual storage area network via a second port of the virtualization engine, wherein at least a portion of I/O operations received by the virtualization engine through the first port thereof are routed through the second port thereof to both the first port of the first storage device and the first port of the second storage device via a plurality of data paths established in the second virtual storage area network, wherein the virtualization engine controls directing of the at least a portion of I/O operations via a first data transfer path in the second virtual storage area network to the first storage device and via a second data transfer path in the second virtual storage area network to the second storage device, wherein I/O operations for the first port of the first storage device are blocked before the first storage device and the second storage device are coupled to the second virtual storage area network, and wherein the routing of the at least the portion of the I/O operations received by virtualization engine is performed after unblocking the I/O operations for the first port of the first storage device.

18. The system according to claim 17, wherein the at least a portion of I/O operations routed from the virtualization engine to the second virtual storage area network are routed through the second virtual storage area network to the first port of the second storage device.

19. The system according to claim 18, wherein the at least a portion of I/O operations routed from the virtualization engine to the second virtual storage area network are routed through the second virtual storage area network to the first port of the first storage device.

20. The system according to claim 17, wherein data is migrated from the first storage device to the second storage device via the second virtual storage area network.

21. The system according to claim 17, wherein the virtualization engine includes virtual logical unit numbers that are mapped to physical logical unit numbers of at least one of: the first storage device and the second storage device.

22. A method for providing non-disruptive data mobility among a first storage device coupled to a storage area network and a second storage device coupled to the storage area network, the method comprising:
blocking I/O operations for a first port the first storage device coupled to the storage area network, wherein the first port is associated with an identifier;
creating a first virtual storage area network and a second virtual storage area network within the storage area network;
establishing a connection between a host and the first virtual storage area network;
establishing a connection between the first virtual storage area network and the second virtual storage area network;
after creating the first virtual storage area network and the second virtual storage area network, unblocking the I/O operations for the first port of the first storage device; and
after unblocking the I/O operations for the first port of the first storage device, causing at least a portion of I/O operations by the host to be routed to both the first port of the first storage device and a first port of the second storage device via a plurality of data paths established in the second virtual storage area network, wherein the virtualization engine controls directing of the at least a portion of I/O operations via a first data transfer path in the second virtual storage area network to the first storage device and via a second data transfer path in the second virtual storage area network to the second storage device, and wherein pathing information at the host directing I/O operations between the host and the first port of the first storage device associated with the identifier is independent of a routing of the I/O operations through the second virtual storage area network.

23. The method according to claim 22, wherein the at least a portion of I/O operations routed through the second virtual storage area network are routed to the first port of the second storage device.

24. Computer software, stored in a non-transitory computer-readable medium, for providing non-disruptive data mobility among a first storage device coupled to a storage area network and a second storage device coupled to the storage area network, the computer software comprising:
executable code that blocks I/O operations for a first port the first storage device coupled to the storage area network, wherein the first port is associated with an identifier;
executable code that creates a first virtual storage area network and a second virtual storage area network within the storage area network;
executable code that establishes a connection between a host and the first virtual storage area network;
executable code that establishes a connection between the first virtual storage area network and the second virtual storage area network;
executable code that, after creating the first virtual storage area network and the second virtual storage area network, unblocks the I/O operations for the first port of the first storage device; and executable code that, after unblocking the I/O operations for the first port of the first storage device, causes at least a portion of I/O operations by the host to be routed to both the first port of the first storage device and a first port of the second storage device via a plurality of data paths established in the second virtual storage area network, wherein the virtualization engine controls directing of the at least a portion of I/O operations via a first data transfer path in the second virtual storage area network to the first storage device and via a second data transfer path in the second virtual storage area network to the second storage device, and wherein pathing information at the host directing I/O operations between the host and the first port of the first storage device associated with the identifier is independent of a routing of the I/O operations through the second virtual storage area network.

25. The computer software according to claim 24, wherein the at least a portion of I/O operations routed through the second virtual storage area network are routed to the first port of the second storage device.

* * * * *